United States Patent
Yamaguchi et al.

(10) Patent No.: US 6,859,266 B2
(45) Date of Patent: Feb. 22, 2005

(54) OPTICAL MOVEMENT DETECTING DEVICE AND TRANSPORT SYSTEM USING THE SAME

(75) Inventors: Akifumi Yamaguchi, Kashiba (JP); Hisakazu Sugiyama, Nara-ken (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/345,328

(22) Filed: Jan. 16, 2003

(65) Prior Publication Data

US 2003/0133097 A1 Jul. 17, 2003

(30) Foreign Application Priority Data

Jan. 17, 2002 (JP) ..................................... P2002-008807

(51) Int. Cl.[7] ................................................. G01P 3/36
(52) U.S. Cl. ........................................ 356/28; 356/400
(58) Field of Search ................................. 356/28, 400

(56) References Cited

U.S. PATENT DOCUMENTS

| | | | | |
|---|---|---|---|---|
| 3,446,558 A | * | 5/1969 | Seaton | 356/341 |
| 3,508,066 A | * | 4/1970 | Agar | 356/28 |
| 3,799,671 A | * | 3/1974 | Schweizer | 356/28 |
| 3,804,517 A | * | 4/1974 | Meyer et al. | 356/28 |
| 3,804,518 A | * | 4/1974 | Meyer | 356/28 |
| 3,865,487 A | * | 2/1975 | Andermo | 356/28 |
| 4,312,592 A | * | 1/1982 | Sabater et al. | 356/28 |
| 5,383,014 A | * | 1/1995 | Nowak et al. | 356/28 |

FOREIGN PATENT DOCUMENTS

| | | | |
|---|---|---|---|
| JP | 2-145972 | * | 5/1990 |
| JP | 6-34647 A | | 2/1994 |
| JP | 8-292263 A | | 11/1996 |

* cited by examiner

*Primary Examiner*—Thomas H. Tarcza
*Assistant Examiner*—Isam Alsomiri
(74) *Attorney, Agent, or Firm*—Birch, Stewart, Kolasch & Birch, LLP

(57) ABSTRACT

In an optical movement detecting device, two semiconductor lasers irradiate an object with respective light beams to form two light spots on the object. Two light-receiving elements receive the two light beams reflected from the two light spots respectively and traveling in a predetermined direction. Based on a difference in phase between two signals S1, S2 outputted from the two light-receiving elements, a signal processor derives a movement speed of the object.

10 Claims, 7 Drawing Sheets

$\alpha \neq \beta$

OUTPUT OF
LIGHT-RECEIVING
ELEMENT 17

OUTPUT OF
LIGHT-RECEIVING
ELEMENT 18

OPTICAL MOVEMENT DETECTING DEVICE AND TRANSPORT SYSTEM USING THE SAME

BACKGROUND OF THE INVENTION

1. Field of the Invention

The present invention relates to an optical movement detecting device for detecting a paper-transporting speed and/or a paper travel distance in devices such as a printer, a copying machine, and the like and also for measuring speeds of objects not having a mirror surface in a noncontact manner.

2. Description of the Related Art

A conventional optical movement detecting device, which is as shown in FIG. 11, has two distance measuring sensors 101, 102 and a processor 103.

The principle of the operation of the distance measuring sensors 101, 102 will be described below with reference to FIG. 12. Each of the distance measuring sensors 101 and 102 has an emission part 104, a lens 105 for condensing diffused light emitted from the emission part 104, a light-receiving part 107 and a lens 108 for condensing light reflected from an object 106 onto the light-receiving part 107. The light emitted by the emission part 104 is vertically incident on the object 106. Light reflected from the object 106 is condensed onto the light-receiving part 107. For the light-receiving part 107, a PSD (position sensitive device) is used.

The PSD has two output terminals. In correspondence to the position of a spot light condensed onto a light-receiving surface of the light-receiving part 107, the output ratio between the two output terminals changes.

Therefore, in the distance measuring sensor using the PSD, the output ratio between the two output terminals changes in dependence on the distance between the object to be measured and the distance measuring sensor.

More specifically, as shown in FIG. 11, when the object 106 moves in the direction shown with arrow X, the distance between the object 106 and the distance measuring sensor 101 as well as the distance measuring sensor 102 fluctuates by the amount of surface unevenness or irregularities of the object 106. As a result, the distance measuring sensors 101, 102 generate respective output signals A, B in correspondence to the amount of surface irregularities of the object 106.

FIGS. 13A and 13B show the waveforms of the output signals A and B, respectively. As is seen from these figures, in dependence on the movement speed of the object 106 in the direction shown with arrow X, the waveform of the signal B outputted from the distance measuring sensor 102 lags by Δt behind that of the signal A outputted from the distance measuring sensor 101. Based on the lag Δt, a processor 103 computes the movement speed and movement amount of the object 106.

As another background art, there is an optical movement detecting device adopting laser Doppler scheme.

The aforementioned conventional optical movement detecting device is capable of measuring the movement speed of the object 106 when it has irregularities that can be detected by the sensors 101, 102 on its surface. However it is difficult for the optical movement detecting device to measure the movement speed of the object 106 if it has a comparatively smooth surface.

The optical movement detecting device adopting the laser Doppler scheme measures the movement speed of the object by utilizing diffused light on its surface. Therefore, if the surface of the object is smooth, it is difficult to measure the movement speed. In addition, the optical movement detecting device is large in size and expensive.

SUMMARY OF THE INVENTION

Therefore, it is an object of the present invention to provide an optical movement detecting device compact, inexpensive, and capable of measuring the movement speed of an object, even though its surface is not very irregular.

In order to accomplish the above object, according to an aspect of the present invention, there is provided an optical movement detecting device including:

irradiating means for irradiating an object to be measured moving in a predetermined direction with two light beams to form two light spots on the object at a predetermined interval in the direction of movement of the object;

light-receiving means for receiving, by two light-receiving elements, part of each of the two light beams reflected from the two light spots that travels in a predetermined direction through a condensing element, and outputting detection signals from the two light-receiving elements; and computing means for computing a movement speed of the object, based on a difference in phase between the output signals of the two light-receiving elements of the light-receiving means.

In the optical movement detecting device, the irradiating means apply two light beams to the object moving in the predetermined direction to form two light spots on the object at a predetermined interval in the movement direction. Of all components of the reflected light from the light spots, the light-receiving means receive only light components traveling in the predetermined direction by the two light-receiving elements through the condensing elements, and output detection signals of the two light-receiving elements.

The computing means derives the movement speed of the object, based on the difference between the phases of the two signals outputted from the respective light-receiving elements of the light-receiving means.

Again, according to the present invention, the light-receiving means receive two light beams, which were emitted to the two light spots, reflected therefrom, and traveled in the predetermined direction, by the two light-receiving elements respectively. The computing means derives the movement speed of the object, based on the difference between the phases of the signals outputted from the two light-receiving elements. Therefore the optical movement detecting device of the present invention is allowed to be a compact and inexpensive device capable of measuring the movement speed of the object even when the object has a comparatively smooth surface having little irregularities, unless the surface of the object has a mirror surface.

In one embodiment, the two light beams emitted by the irradiating means and impinging on the object are parallel with each other.

In the optical movement detecting device of the embodiment, it is possible to make incident states of the two light beams incident on an object identical to each other and also reflection states of two light beams reflected from the object identical to each other. Therefore, the waveform of the output signal of one light-receiving element is equivalent to a waveform obtained by delaying the waveform of the output signal of the other light-receiving element by a certain time period. Therefore it is possible to measure the movement speed of the object with high accuracy.

In one embodiment, two light beams that, after reflected from the respective light spots, travel in the predetermined direction and are received by the light-receiving means are parallel with each other.

In the optical movement detecting device of the embodiment, it is possible to reduce the difference between the amount of light incident on one light-receiving element and the amount of light incident on the other light-receiving element. Therefore it is possible to measure the movement speed of the object with high accuracy.

In one embodiment, a distance between one light spot and one associated light-receiving element is equal to a distance between the other light spot and the other light-receiving element.

In this case also, it is possible to reduce the difference between the amount of light incident on one light-receiving element and the amount of light incident on the other light-receiving element. Therefore it is possible to measure the movement speed of the object with high accuracy.

In one embodiment, optical axes of the two light beams incident on the object and optical axes of the two light beams reflected from the object are in one plane.

This arrangement makes it possible to reduce a dimension of the device in a direction vertical to the traveling direction of the object. Thus it is possible to make the optical movement detecting device compact.

In one embodiment, optical axes of the two light beams that impinge on the object and are reflected therefrom are in different planes, and the direction of movement of the object is vertical to the planes.

Therefore, by arranging both one light-receiving element and one condensing element in each of the different planes, in which the optical axes of the light beams are present, so that the light-receiving element and the condensing element in one plane is opposed to the light-receiving element and the condensing element in the other plane in the direction vertical to the planes, the distance between one light spot and the associated condensing element can be made equal to the distance between the other light spot and the associated condensing element. That is, by disposing the optical axes of the two light beams in the two planes opposed to each other in the movement direction of the object and by disposing the light-receiving elements and the condensing elements for the two beams identically in the two planes, the distance between one light spot and the associated condensing element can be made equal to the distance between the other light spot and the associated condensing element. Therefore unlike the case in which the optical axes of the two light beams are present in the same plane, it is unnecessary to adjust the distances between the light spots on the object and the light-receiving elements according to an angle formed between the object and the optical axis at the light-receiving side in disposing the light-receiving elements and the condensing elements.

In one embodiment, the optical axes of the two light beams incident on the object and the optical axes of the two light beams reflected from the object coincide with each other.

With the above arrangement, if the object to be measured is dislocated in the direction of the optical axis, there is little change in the position and size of a spot against which the light strikes. Thus it is possible to detect the speed of the object even though the object is dislocated in the normal direction to the object.

In one embodiment, the irradiating means has a single semiconductor laser serving as an emission element, and a light beam emitted by the semiconductor laser is divided into two by a beam splitter to irradiate the object with the two light beams.

This arrangement not only reduces variations of the intensity of the two light spots on the object, but also contributes to reduction of size and costs of the optical movement detecting device.

According to another aspect of the present invention, there is provided a transport system which includes transport means for transporting an object, control means for controlling the transport means, and the above-described optical movement detecting device for measuring a movement speed of the object to supply the measured movement speed to the control means. In the transport system, the movement speed of the object measured by the optical movement detecting device is fed back to the control means to keep the movement speed of the object constant.

According to a further aspect of the present invention, there is provided a transport system which includes transport means for transporting an object, processing means for processing the object while the object is being transported, and the aforementioned optical movement detecting device for measuring a movement speed of the object to supply the measured movement speed to the processing means. In the transport system, the movement speed of the object measured by the optical movement detecting device is fed back to the processing means so that the processing of the object is carried out at a predetermined timing.

BRIEF DESCRIPTION OF THE DRAWINGS

The present invention will become more fully understood from the detailed description given hereinbelow and the accompanying drawings which are given by way of illustration only, and thus are not intended to limit the present invention, and wherein.

DETAILED DESCRIPTION OF THE INVENTION

Embodiments of the optical movement detecting device of the present invention will be described in detail below with reference to the drawings.

Figure 1:
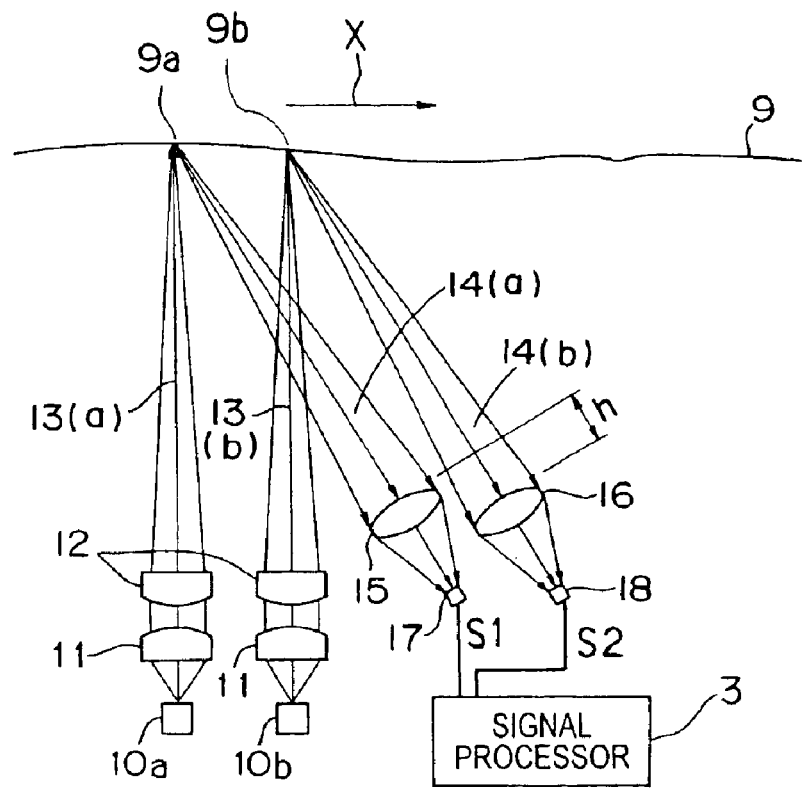
FIG. 1 shows the construction of a first embodiment of the optical movement detecting device of the present invention.

FIG. 1 shows an embodiment of the optical movement detecting device of the present invention. The optical movement detecting device has two semiconductor lasers 10a, 10b spaced at a predetermined interval from and opposed to an object 9 to be measured. The semiconductor lasers 10a, 10b are spaced at a predetermined interval from each other in a movement direction X of the object 9. The distance from the object 9 to the semiconductor laser 10a is almost equal to that from the object 9 to the semiconductor laser 10b. The semiconductor lasers 10a, 10b serve as light sources of irradiating means and generate radiations which will be incident light beams (also referred to as "lights") 13(a) and 13(b) to impinge on the object 9. A collimator lens 11 and an objective lens 12 are disposed between the object 9 and each of the semiconductor lasers 10a and 10b. The collimator lenses 11, 11, the objective lenses 12, 12, and the semiconductor lasers 10a, 10b constitute the irradiating means.

Two light-receiving elements 17, 18 are disposed, spaced at a predetermined interval in the movement direction X of the object 9 from the two semiconductor lasers 10a and 10b, respectively. The distance between the light-receiving element 17, 18 and the object 9 is set shorter than the distance between the semiconductor laser 10a, 10b and the object 9. The two light-receiving elements 17, 18 are oriented to receive reflected light beams (also referred to as "lights") 14(a), 14(b) of the lights 13(a), 13(b) that are emitted by the semiconductor lasers 10a, 10b and reflected from two spots 9a, 9b of the object 9 respectively. Condenser lenses 15, 16 are disposed in front of the light-receiving elements 17, 18 respectively, with the condenser lenses 15, 16 opposed to the light-receiving elements 17, 18 respectively.

The optical movement detecting device further has a signal processor 3. Upon receipt of detection signals S1, S2 from the light-receiving elements 17, 18, which generate the detection signals from the reflected lights 14(a), 14(b), the signal processor 3 determines a movement speed of the object 9 based on the difference in phase between the detection signal S1 and the detection signal S2.

In the first embodiment, the collimator lenses 11, 11 collimate respective radiation emitted by the semiconductor lasers 10a, 10b. The collimated light passes through the objective lenses 12, 12, whereby the two lights 13(a), 13(b) are obtained. The optical axis of the light 13(a) and that of the light 13(b) are parallel with each other.

Thereafter the object 9 moving in the predetermined direction X is irradiated with the light 13(a), 13(b) to form the light spots 9a, 9b on the object 9 at a predetermined interval in the predetermined direction X. At this time, the light beams 13(a) and 13(b) travel parallel with each other (incident on the object 9 at an equal angle), so that the light 13(a) and the light 13(b) are capable of being incident on the object 9 and reflected therefrom similarly to each other.

Figures 2A, 2B:
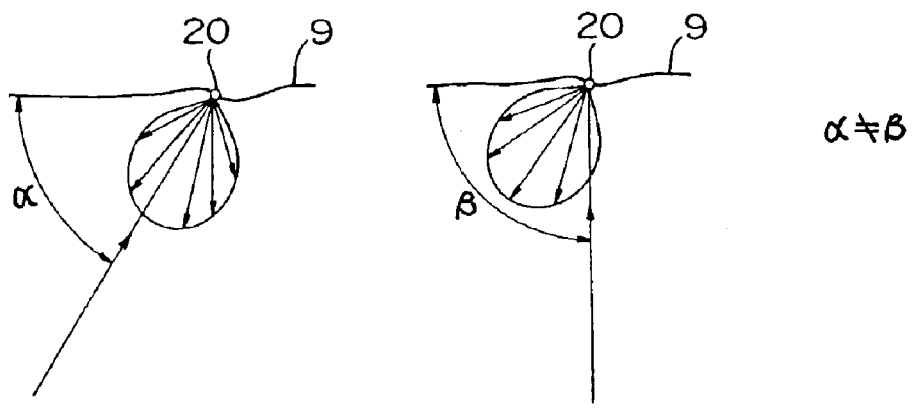
FIG. 2A shows an example of incidence of light upon an object and reflection of the light from the object in the embodiment of the optical movement detecting device of the present invention.
FIG. 2B shows another example of incidence of light upon an object and reflection of the light from the object.

If the light 13(a) and light 13(b) are not parallel with each other, they impinge on the same position 20 of the object 9 at different incident angles α and β, as shown in FIGS. 2A and 2B. Therefore there will be a difference between the directionality of the reflected light of the light 13(a) and that of the reflected light of the light 13(b) at the incident position 20. Thus there is a difference between the intensity of the reflected light of the light 13(a) and that of the reflected light of the light 13(b) in a particular direction.

Thereafter, of the components of lights reflected from the light spots 9a, 9b, only light components 14(a), 14(b) traveling in a particular direction through the condenser lenses 15, 16 respectively are received and detected by the light-receiving elements 17, 18. As shown in FIG. 1, the reflected light components 14(a), 14(b) travel in a direction not orthogonal with respect to the object 9. Also as shown in FIG. 1, the condenser lenses 15, 16 are disposed such that the distance between one light spot 9a and the associated condenser lens 15 is equal to the distance between the other light spot 9b and the associated condenser lens 16. That is, there is set a distance, h, between a plane tangent to the condenser lens 15 at its foremost point and a plane tangent to the condenser lens 16 at its foremost point.

Figure 3:
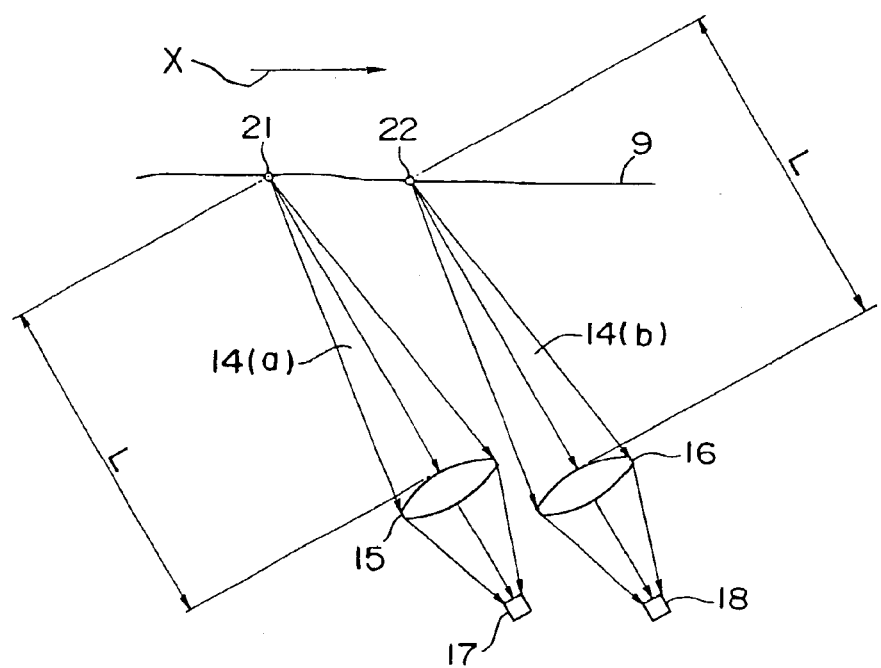
FIG. 3 shows an optical path of light reflected from an object in the embodiment of the optical movement detecting device of the present invention.

As shown in FIG. 3, by making the light beams 14(a) and the light beam 14(b) traveling in the particular direction parallel with each other, the distance between a light spot 21 and the condenser lens 15 and the distance between a light spot 22 and the condenser lens 16 are set at the same value L. This makes it possible to enter only the light reflected in the same direction from the same position of the surface of the object 9 into the light-receiving elements 17 and 18 respectively, although there is a time lag owing to the movement of the object 9 from the light spot 21 to the light spot 22. That is, only the reflected lights 14(a), 14(b) having the same amount is allowed to enter the light-receiving elements 17 and 18 respectively.

Figure 4A:
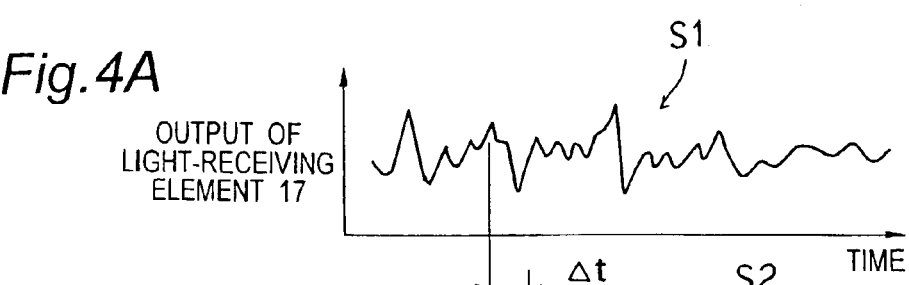
FIGS. 4A and 4B show waveforms of two light-receiving elements in the embodiment.
Figure 4B:

In this case, as is apparent from FIGS. 4A and 4B showing the waveforms of each of detection signals S1 and S2 outputted from the light-receiving element 17 and 18 respectively, the waveform of the detection signal S1 lags by Δt behind the waveform of the detection signal S2. The movement speed of the object 9 is derived by electrically processing the delay or lag Δt at the signal processor 3. Specifically, the movement speed of the object 9 is obtained by dividing the distance between the light spot 21 and the light spot 22 by the delay Δt.

Figure 5:
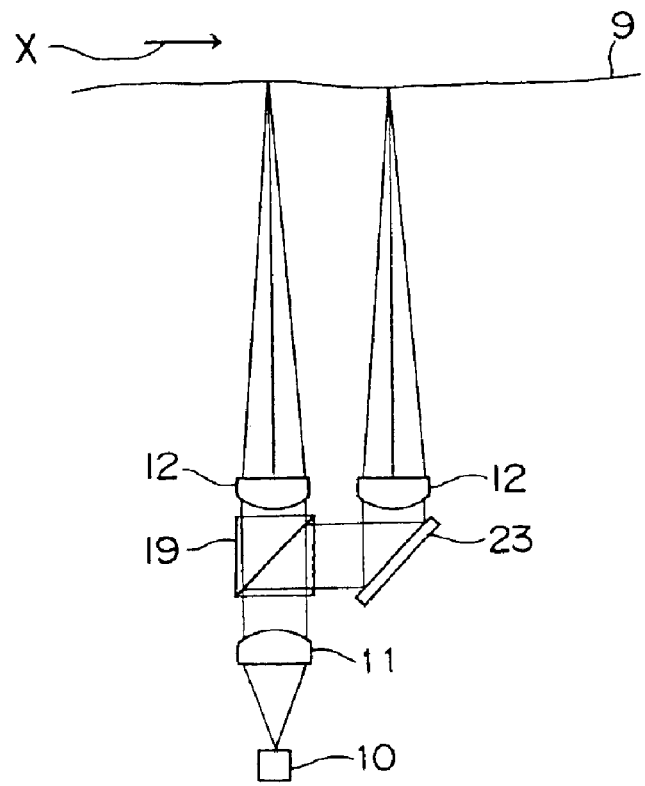
FIG. 5 shows an optical path in a modification of the embodiment of the optical movement detecting device of the present invention, which has one semiconductor laser.

The light source at the emission side may be constructed and arranged as shown in FIG. 5. More specifically, a light beam emitted from one semiconductor laser 10 is collimated by a collimator lens 11 and then divided into two by a beam splitter 19 to thereby obtain two light beams. A first light beam is incident directly and straight on the object 9 through a lens 12. The other, second light beam is changed in its direction by a mirror 23 to make its optical axis parallel with that of the first light beam. Thereafter the second light is incident on a lens 12 and then on the object 9. In this case, unlike the case in which two semiconductor lasers are used and two parallel light beams are formed by collimating radiations emitted by the two semiconductor lasers by the collimator lens, it is possible to eliminate a possibility that the light intensities at the two light spots on the object 9 differ from each other owing to a difference in output between the two semiconductor lasers. Different from the case in which two semiconductor lasers are used, only one collimator lens 11 is required in this case. Thus it is possible to make the optical movement detecting device compact and reduce its cost.

In the optical movement detecting device of the embodiment described above, a first optical system having the semiconductor laser 10a, the collimator lens 11, the objective lens 12, the condenser lens 15, and the light-receiving element 17 is disposed in a plane in which the other, second optical system having the semiconductor laser 10b, the collimator lens 11, the objective lens 12, the condenser lens 16, and the light-receiving element 18 is also disposed. However, the two optical systems may be disposed in different planes parallel with each other.

Figure 6:
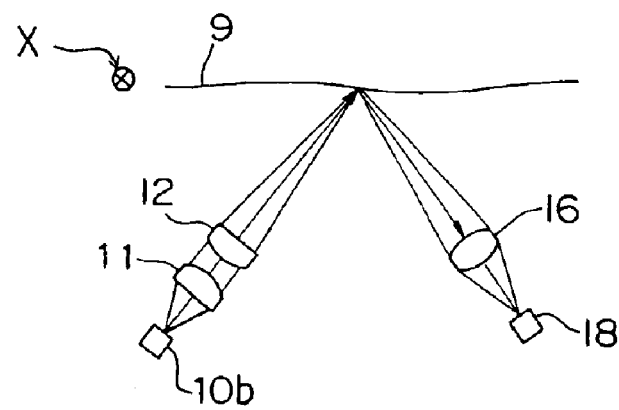
FIG. 6 shows another modification of the embodiment of the optical movement detecting device of the present invention in which optical axes of two light beams incident on an object and optical axes of the light beams reflected therefrom are not in the same plane.

That is, as shown in FIG. 6, the semiconductor laser 10b, the collimator lens 11, the objective lens 12, the condenser lens 16, and the light-receiving element 18 constituting the second optical system may be disposed in one plane orthogonal to the movement direction X (namely, vertical to a drawing sheet on which FIG. 6 is shown) of the object 9, whereas the semiconductor laser 10a, the collimator lens 11, the objective lens 12, the condenser lens 15, and the light-receiving element 17 constituting the first optical system may be disposed in another plane spaced from the one plane at a predetermined interval in the movement direction X. In this case, in FIG. 6, the semiconductor laser 10a, the collimator lens 11, the objective lens 12, the condenser lens 15, and the light-receiving element 17 of the first optical system are opposed to the semiconductor laser 10b, the collimator lens 11, the objective lens 12, the condenser lens 16, and the light-receiving element 18 of the other optical system, respectively, at the predetermined interval in the movement direction X. Therefore in FIG. 6, the semiconductor laser 10a, the collimator lens 11, the objective lens 12, the condenser lens 15, and the light-receiving element 17 are hidden by the semiconductor laser 10b, the collimator lens 11, the objective lens 12, the condenser lens 16, and the light-receiving element 18 respectively and cannot be seen. In this case, the same plane contacts the condenser lenses 15, 16. Thus, the distance between one light spot and the condenser lens 15 is made equal to the distance between the other light spot and the condenser lens 16 by merely juxtaposing or aligning the condenser lenses 15 and 16 and also juxtaposing or aligning the light-receiving elements 17 and 18 as described above. On the other hand, in the disposition of FIG. 1, the optical axes of the two light beams incident on the object and the optical axes of the light beams reflected from the object are in the same plane. Therefore as shown in FIG. 1, to equalize the distance between the light spot 9a and the condenser lens 15 to the distance between the other light spot 9b and the condenser lens 16, it is necessary to place the plane contacting the lens 15 at the intersection of the surface thereof and the optical axis thereof spaced from the other plane contacting the lens 16 at the intersection of the surface thereof and the optical axis thereof by dimension, h.

Figure 7A:
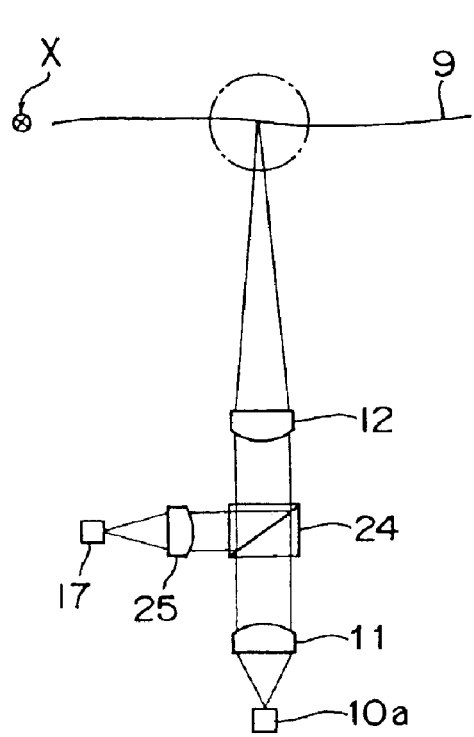
FIG. 7A shows still another modification of the embodiment of the optical movement detecting device of the present invention in which optical axes of two lights of the two systems incident on the object and optical axes of the lights of the two systems reflected therefrom coincide with each other.
Figure 7B:
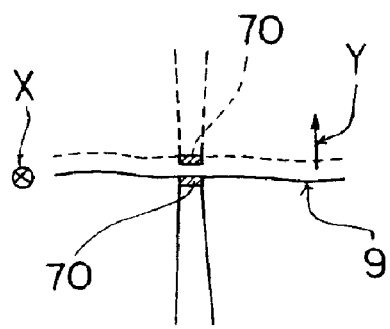
FIG. 7B is an enlarged view of a part of FIG. 7A.

One optical system may be so disposed such that the optical axis of light incident on the object 9 and the optical axis of light reflected therefrom are coincident, or in a straight line. In this case, as shown in FIG. 7A, a semiconductor laser 10a, a collimator lens 11, a beam splitter 24, and an objective lens 12 are arranged in a plane and substantially in a straight line toward the object 9. Furthermore, a condenser lens 25 and a light-receiving element 17 are sequentially disposed in the plane and in a direction orthogonal to the straight line. One optical system is composed of the semiconductor laser 10a, the collimator lens 11, the beam splitter 24, the objective lens 12, the condenser lens 25, and the light-receiving element 17. A semiconductor laser 10b, a collimator lens 11, a beam splitter 24, an objective lens 12, a condenser lens 25, and a light-receiving element 18, which all constitute the other optical system, are disposed in another plane extending parallel with the plane in which the one optical system shown in FIG. 7A is disposed, with a predetermined interval provided between the two planes in the movement direction X of the object 9. Thus, the semiconductor laser 10b, collimator lens 11, beam splitter 24, objective lens 12, condenser lens 25, and light-receiving element 18 constituting the other optical system are spaced from the respective counterparts, namely, the semiconductor laser 10a, collimator lens 11, beam splitter 24, objective lens 12, condenser lens 25, and light-receiving element 17, at the predetermined interval in the movement direction X of the object 9. Therefore in FIG. 7A, the components of the other optical system are hidden by the semiconductor laser 10a, the collimator lens 11, the beam splitter 24, the objective lens 12, the condenser lens 25, and the light-receiving element 17 and cannot be seen. In the modification shown in FIG. 7A, the beam splitter 24 is necessary to allow the reflected light to be incident on the light-receiving element 17. Also, as described above, two optical systems are arranged at an interval in a direction vertical (movement direction X) to the drawing sheet on which FIG. 7 is shown.

Figure 8:
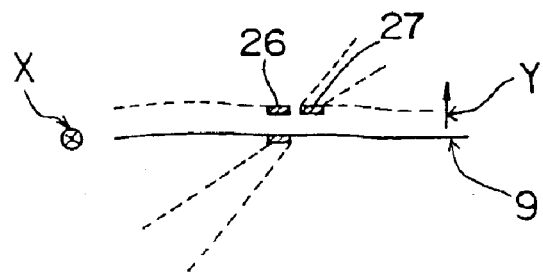
FIG. 8 is an explanatory view showing that in the modification shown in FIG. 7A, if the optical axis of incident light is not vertical to the object and the object moves in a direction of a normal line of the object, the light does not strike against a proper spot position but strikes against a dislocated position.

In the construction of the two optical systems shown in FIG. 7A, the optical axis of the light incident on the object 9 and the optical axis of the light reflected therefrom are in a straight line, i.e., coincide with each other. In other words, the direction of incidence of light on the object 9 and the direction of reflection therefrom are vertical to the object 9. In this optical system, as shown with broken lines in FIG. 7B, which shows an enlarged view of an encircled portion of FIG. 7A, if the object 9 moves in the direction of a normal line Y of the object 9, it follows that the object 9 moves vertically to the optical axis. Therefore there is little change in the position and size of a spot 70 against which the light strikes. On the other hand, in the case where the optical axis is not vertical to the object 9, if the object 9 moves in the direction of the normal line Y of the object 9 as shown in FIG. 8, the light does not strike against a proper spot position 26 but strikes against a dislocated position 27.

Figure 9:
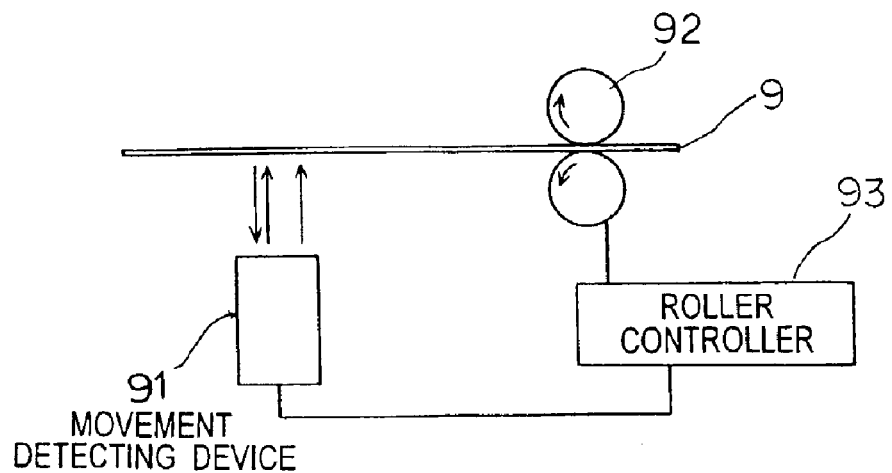
FIG. 9 shows a transport system having an optical movement detecting device according to one of the above-described embodiments for keeping the speed of an object constant.
Figure 10:
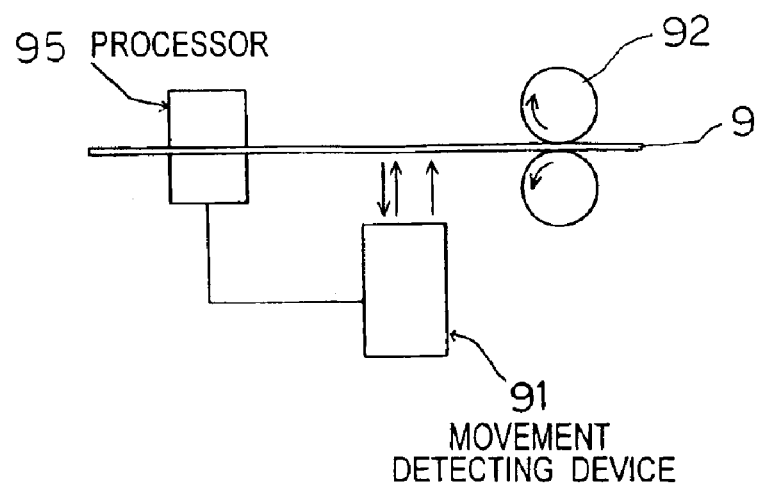
FIG. 10 shows a transport system having an optical movement detecting device according to one of the above-described embodiments for executing processing of an object at a predetermined position.
Figure 11:
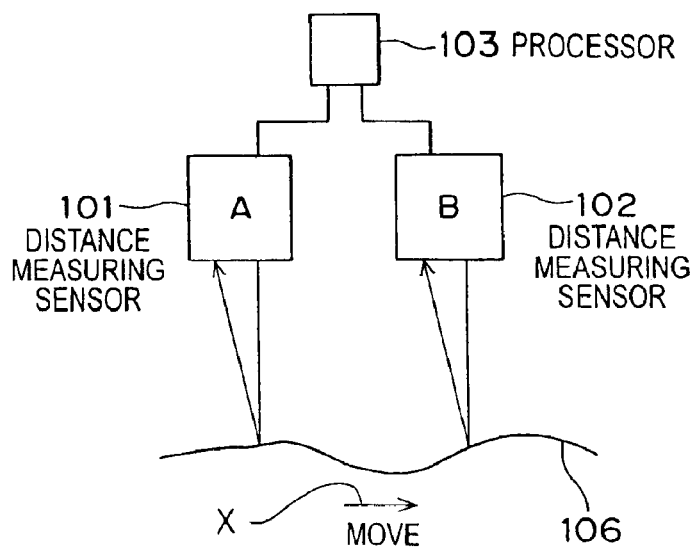
FIG. 11 shows a conventional optical movement detecting device.
Figure 12:
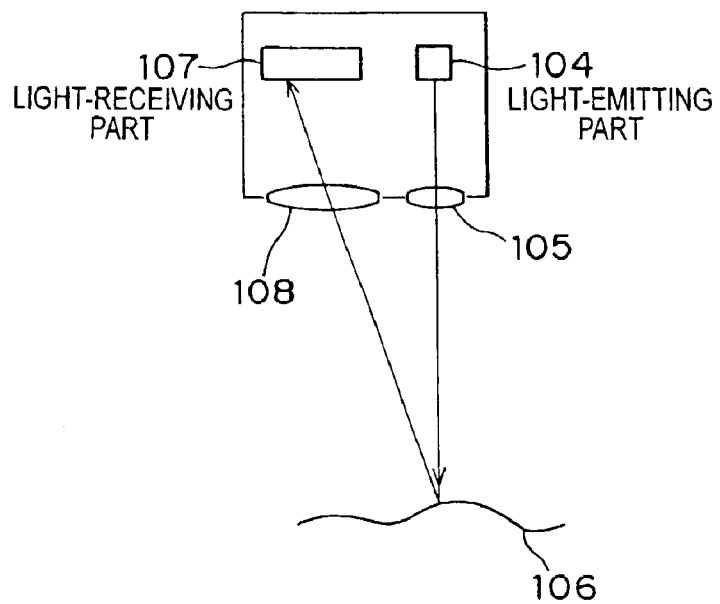
FIG. 12 shows a distance measuring sensor that is used for the conventional optical movement detecting device.
Figures 13A, 13B:
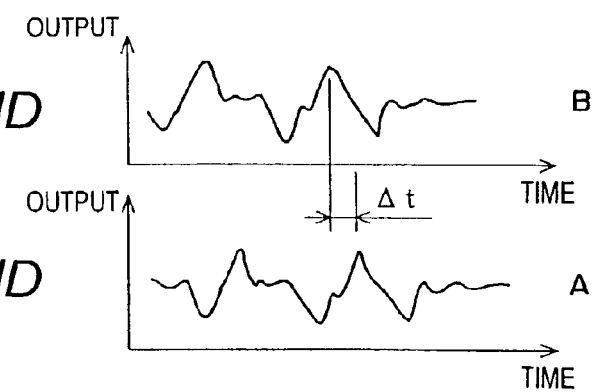
FIGS. 13A and 13B show waveforms of outputs from the conventional optical movement detecting device.

Further as shown in FIG. 9, it is possible to realize a transport system having an optical movement detecting device 91 of any one of the embodiments, in which the movement speed of the object 9 measured by the optical movement detecting device 91 is fed back to a roller controller 93 to keep the movement speed of the object 9 transported by a transport roller 92 constant. Alternatively or additionally, the movement speed of the object 9 measured by the optical movement detecting device 91 may be fed back, as shown in FIG. 10, to a processor 95 so that the processor 95 controls the timing for processing the object 9. In this case, a transporting/processing system is achievable, in which system the processor 95 carries out predetermined processing of the object 9 at a predetermined position while the transport roller 92 is transporting the object 9.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical movement detecting device, comprising:

irradiating means for irradiating an object to be measured moving in a predetermined direction with two light beams to form two light spots on the object at a predetermined interval in the direction of movement of the object;

light-receiving means for receiving, by two light-receiving elements, part of each of the two light beams reflected from the two light spots that travels in a direction not orthogonal with respect to the object through a condensing element, and outputting detection signals from the two light-receiving elements; and computing means for computing a movement speed of the object, based on a difference in phase between the output signals of the two light-receiving elements of the light-receiving means.

2. The optical movement detecting device according to claim 1, wherein the two light beams emitted by the irradiating means and impinging on the object are parallel with each other.

3. The optical movement detecting device according to claim 1, wherein two light beams that, after reflected from the respective light spots, travel in the predetermined direction and are received by the light-receiving means are parallel with each other.

4. The optical movement detecting device according to claim 1, wherein a distance between one light spot and one associated light-receiving element is equal to a distance between the other light spot arid the other light-receiving element.

5. The optical movement detecting device according to claim 1, wherein optical axes of the two light beams incident on the object and optical axes of the two light beams reflected from the object are in one plane.

6. The optical movement detecting device according to claim 1, wherein optical axes of the two light beams that impinge on the object and are reflected therefrom are in different non-intersecting planes; and the direction of movement of the object is orthogonal to the planes.

7. The optical movement detecting device according to claim 1, wherein the irradiating means has a single semiconductor laser serving as an emission element, and a light beam emitted by the semiconductor laser is divided into two by a beam splitter to irradiate the object with the two light beams.

8. A transport system, comprising:

transport means for transporting an object;

control means for controlling the transport means; and the optical movement detecting device according to claim 1 for computing a movement speed of the object to supply the computed movement speed to the control means, wherein the movement speed of the object measured by the optical movement detecting device is fed back to the control means to keep the movement speed of the object constant.

9. A transport system, comprising:

transport means for transporting an object;

processing means for processing the object while the object is being transported; and the optical movement detecting device according to claim 1 for computing a movement speed of the object to supply the computed movement speed to the processing means, wherein the movement speed of the object measured by the optical movement detecting device is fed back to the processing means so that the processing of the object is carried out at a predetermined timing.

10. The optical movement detecting device according to claim 1, wherein a direction of incidence of the two light beams irradiated on said object is vertical to the object.

* * * * *